United States Patent [19]

Gram

[11] 4,285,709
[45] Aug. 25, 1981

[54] LIQUEFACTOR

[75] Inventor: Anker Gram, North Vancouver, Canada

[73] Assignee: Cleanair Combustion Systems, Ltd., North Vancouver, Canada

[21] Appl. No.: 44,245

[22] Filed: May 31, 1979

Related U.S. Application Data

[63] Continuation of Ser. No. 838,195, Sep. 30, 1977, abandoned.

[51] Int. Cl.$^3$ ............................................... F25J 3/00
[52] U.S. Cl. .......................................... 62/36; 62/24; 62/23; 62/18; 55/62
[58] Field of Search ............... 62/9, 11, 23, 18, 24, 62/36; 55/62

[56] References Cited

U.S. PATENT DOCUMENTS

| | | | |
|---|---|---|---|
| 3,087,291 | 4/1963 | Jackson et al. | 55/62 |
| 3,554,904 | 1/1971 | Humphries | 55/62 |
| 3,894,856 | 7/1975 | Lofredo | 55/62 |

*Primary Examiner*—Norman Yudkoff
*Attorney, Agent, or Firm*—Klarquist, Sparkman, Campbell, Leigh, Whinston & Dellett

[57] ABSTRACT

An apparatus and a process for cleaning and liquifying an input gas. An engine operates on a portion of cleaned gas and discharges exhaust gases. A heat exchanger transfers heat from the exhaust gases to the portion of the cleaned gas. Apparatus for liquifying the cleaned gas is powered by the engines. Molecular sieves clean the input gas to produce the cleaned gas and are regenerated by the portion of the cleaned gas.

19 Claims, 11 Drawing Figures

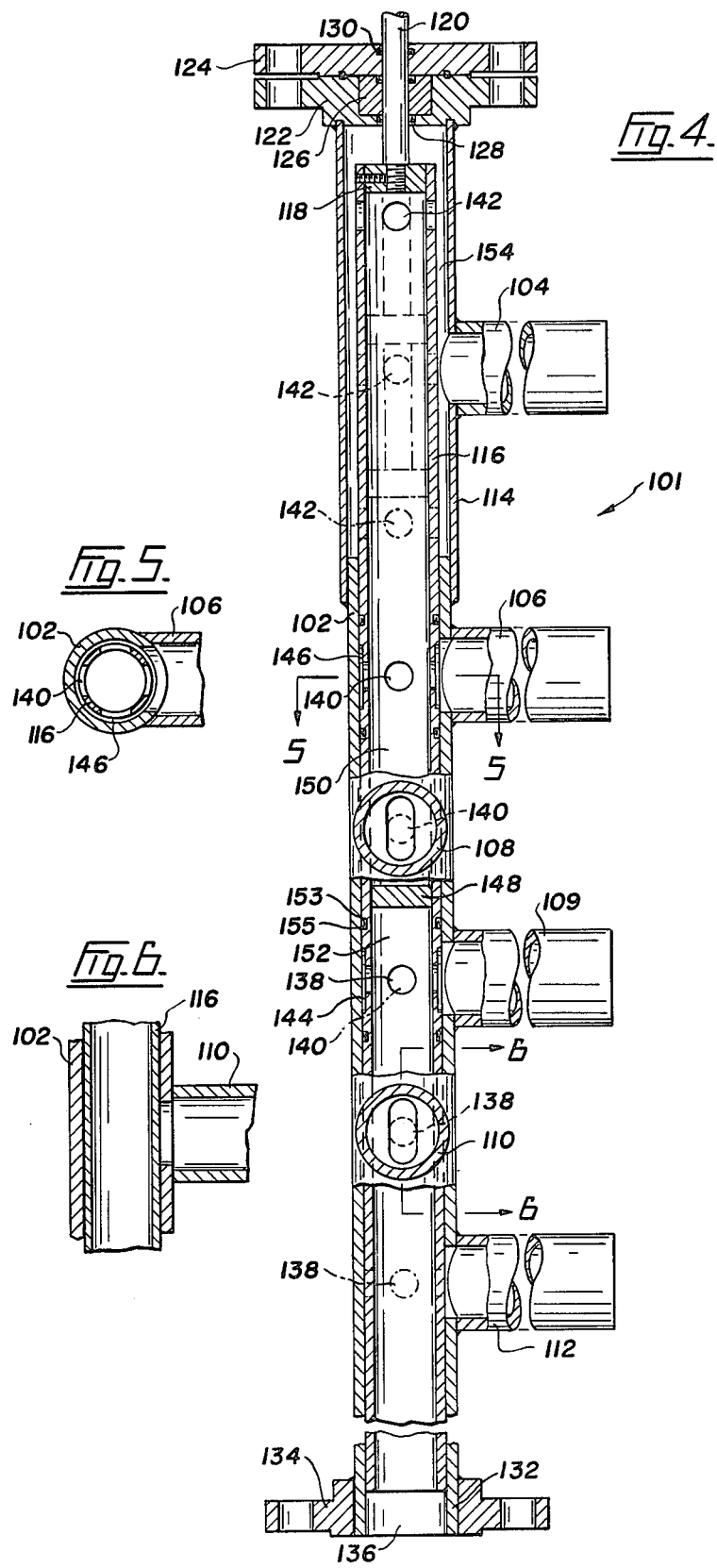

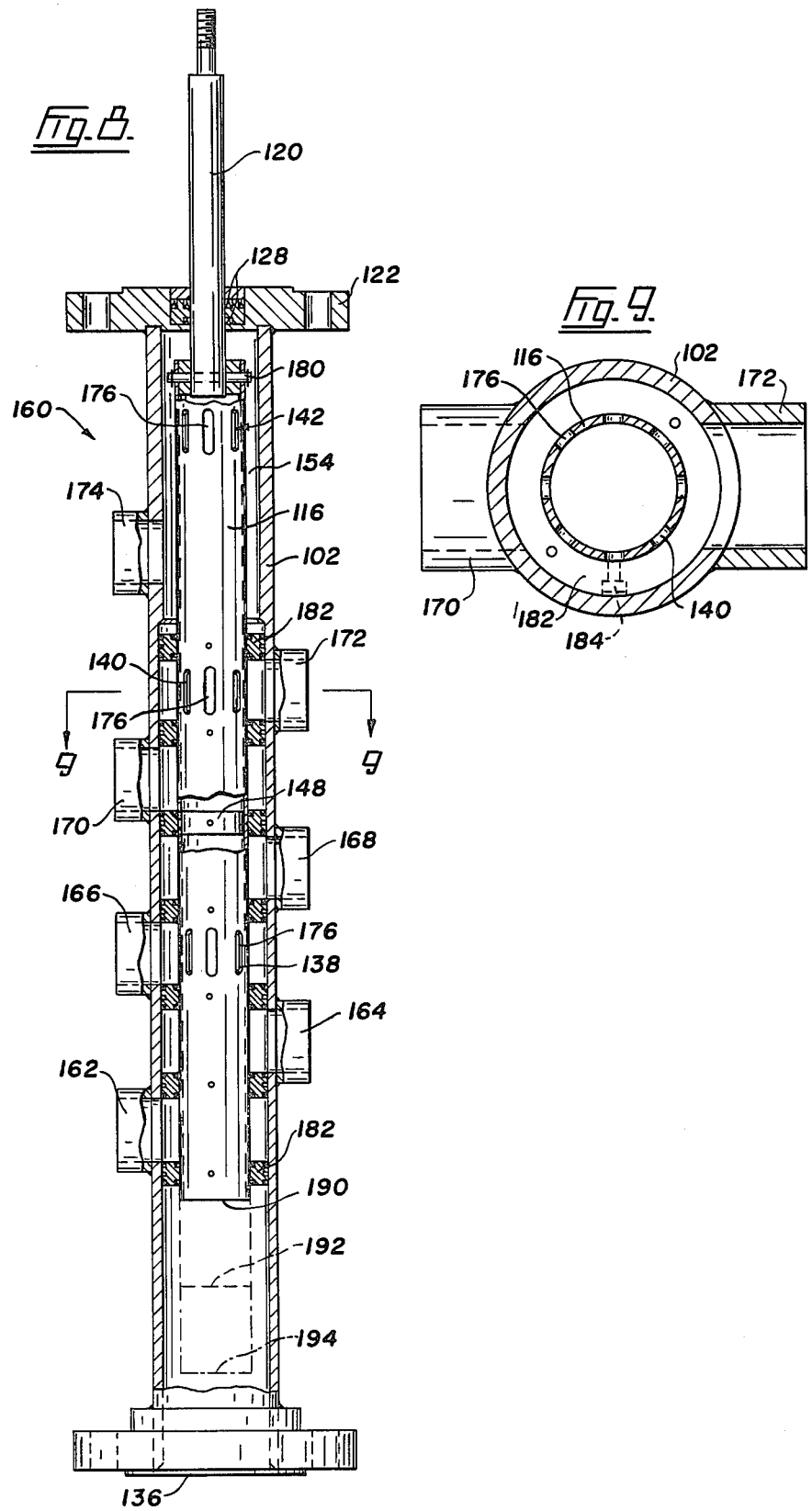

LIQUEFACTOR

This is a continuation, of application Ser. No. 838,195, filed Sept. 30, 1977, now abandoned.

FIELD OF THE INVENTION

This invention relates to a process and apparatus for purifying and liquifying a gas such as natural gas.

DESCRIPTION OF PRIOR ART

Natural gas must be cleaned of water and carbon dioxide prior to liquification. Normally, this can be done by a molecular sieve so water, carbon dioxide, and other impurities are absorbed. After a while the sieve becomes saturated, and it is regenerated by heating it to 500° F. and then cooling it with clean natural gas. The normal approach is to have two containers, one cleaning the gas, while the other is being heated and cooled in preparation for cleaning. The regeneration gas used to heat and cool the second container (which contains all the impurities from the cycle) is normally dumped into a pipeline system and mixed with large quantities of normal gas. Another variation is to provide three containers; one for cleaning, one for heating, and one for cooling.

A problem arises where it is not possible to "dump" the regeneration gas, and flaring this gas would be costly and a waste of energy. In addition, the hot gas normally used for heating the sieve is heated in a salt bath heater using natural gas as a fuel. Where a compact, self-contained liquifying and cleaning apparatus is desired, it is not possible to have the open flame required for a salt bath heater in proximity to the process equipment.

Another problem involving the loss of natural gas occurs in the coal mining field. When long wall mining techniques are used, large volumes of natural gas containing air are released as the overburden collapses behind the advancing mining machinery. The practice has been to drill holes from the surface and syphon off the gas through these holes. When this gas is disposed of, large volumes of potentially useful gas are destroyed. Prior art gas liquifiers have not been of the self-contained and portable nature necessary for easy transportation to the well head, mine, or other location where it is desired to liquify gas.

SUMMARY OF THE INVENTION

According to a first aspect of the invention, there is provided an apparatus for cleaning and liquifying an input gas comprising: an engine adapted to operate on a portion of the cleaned gas and adapted to discharge exhaust gases; a heat exchanger for transfering heat from the exhaust gases to the portion of cleaned gas; means for liquifying the cleaned gas and adapted to be powered by the engine; and, gas cleaning means adapted to be regenerated by the portion of the cleaned gas.

According to a second aspect of the invention, there is provided a process for cleaning and liquifying an input gas comprising: cleaning the input gas with a molecular sieve means to produce a cleaned gas; using a portion of the cleaned gas to cool the molecular sieve means; heating the portion of the cleaned gas in a heat exchanger with the exhaust of an internal combustion engine; using the portion of cleaned gas to heat and purge the molecular sieve means of impurities; burning the portion of cleaned gas in the internal combustion engine; operating liquifying means with the internal combustion engine; and liquifying the cleaned gas with the liquifying means.

According to a third aspect of this invention, there is provided a process for cleaning and liquifying a mine gas containing air and natural gas. The process comprises cleaning the mine gas with a molecular sieve to produce a cleaned gas; separating and liquifying the cleaned gas into, firstly, a liquid natural gas, and secondly, a waste stream containing the air and natural gas; using the waste stream to cool the molecular sieve means; heating the waste stream with the exhaust of an internal combustion engine; using the heated waste stream to heat and purge the molecular sieve means of impurities; burning the waste stream in the internal combustion engine; operating liquifying means with the internal combustion engine; and liquifying the cleaned gas with the liquifying means.

According to a fourth aspect of the invention, there is provided a multiple-pass molecular sieve for cleaning gases of impurities such as carbon dioxide and water. The sieve comprises at least two concentric containers to reduce the loss of heat while providing sufficient gas velocity to clean the gas and regenerate the molecular sieve. The sieve has a first pass for the gas through an inside container and a second pass for the gas between the inside container and an outside container. The cross-sectional area of the containers is such that a given volume flow of gas will have a velocity through the sieve to clean the gas.

According to a fifth aspect of the invention, there is provided a valve for gases. The valve comprises a tubular casing with a plurality of casing apertures for the passage of gases; a tubular stem slidable within the casing and having a plurality of stem apertures for the passage of gases; and sealing means between the stem and casing for preventing the leakage of gases. The stem is slidable to at least two positions, wherein at least one stem aperture is aligned with a casing aperture.

The invention provides a process and apparatus for cleaning and liquifying gases involving a self-contained unit which is readily transportable unlike prior art liquifiers. The portable and self-contained nature of the liquefactor according to the invention permits the liquifying and transportation of liquid natural gas from a wellhead instead of flaring off the natural gas, since the apparatus according to the invention is readily transportable and easily set up where natural gas is available. This prevents the wastage of energy and this is of great concern today. The apparatus is easily set up at a coal mine and allows for the liquifying, and subsequent use, of mining gases previously considered waste products.

BRIEF DESCRIPTION OF THE DRAWINGS

FIG. 1a is a detail of an alternative arrangement for supplying a portion of cleaned gas for cooling a molecular sieve of FIG. 1;

FIG. 4 is a sectional elevational view of a three-position gas valve as shown in FIG. 3;

FIG. 5 is a sectional view taken along section 5—5 of FIG. 4,

FIG. 6 is a sectional view taken along section 6—6 of FIG. 4;

FIG. 8 is a sectional elevational view of a second three-positioned valve for the process of FIG. 7;

FIG. 9 is a sectional view taken along section 9—9 of FIG. 8;

DESCRIPTION OF THE PREFERRED EMBODIMENTS

Figure 1:
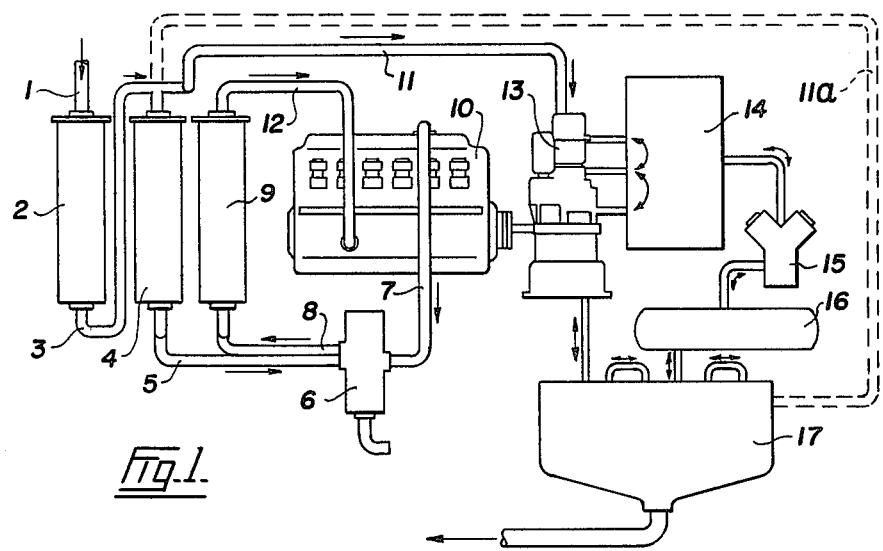
FIG. 1 is a schematic diagram of a process and apparatus for cleaning and liquifying a gas showing the effective pipe connections to the molecular sieves during one cycle of operation.
Figure 3:
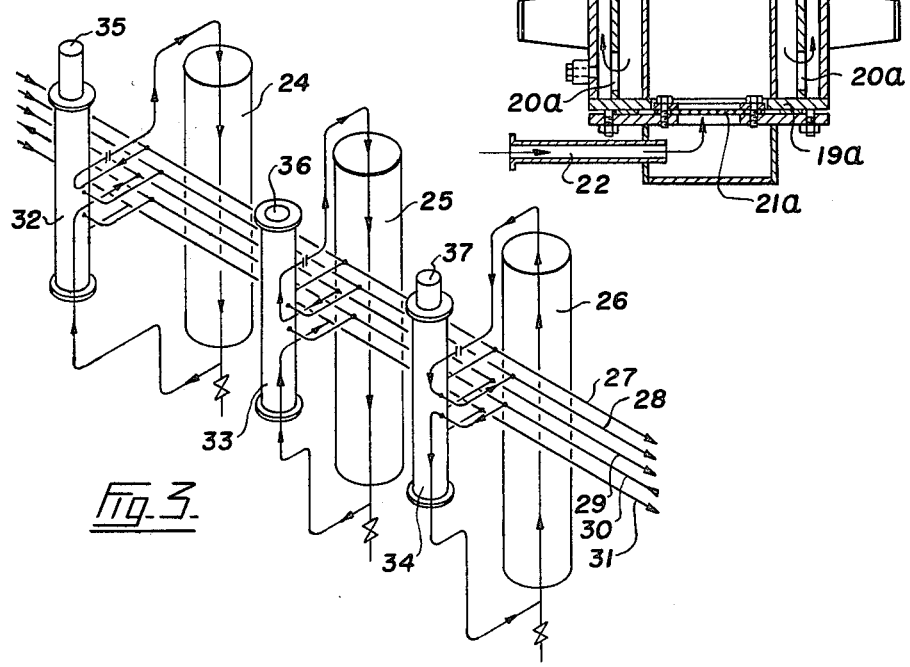
FIG. 3 is a schematic diagram of the three molecular sieve assemblies of FIG. 1, and the valves and piping permitting the cycle of operation to be changed.

FIG. 1 illustrates schematically an apparatus for cleaning and liquifying a gas with the effective piping connections to molecular sieves 2, 4 and 9 during one cycle of operation. During this cycle, conduit 1 is connected to the top of molecular sieve 2. Input gas enters molecular sieve 2, where impurities such as water and carbon dioxide are absorbed, through conduit or manifold 1. The absorption material used in the molecular sieve is well known in the art and will not be described here. After a molecular sieve becomes saturated with impurities, it is regenerated by heating it to 500° F. and cooling it with gas. When three molecular sieve units are employed, as illustrated in FIG. 1, for a given cycle of operation, one molecular sieve operates on a gas cleaning mode cleaning the input gas, a second molecular sieve operates on a molecular sieve heating mode whereby hot gas heats the molecular sieve, and a third molecular sieve operates on a molecular sieve cooling mode whereby the hot sieve is cooled by gas. The mode on which each sieve operates is rotated on a periodic basis. FIG. 1 shows the effective piping connections during one cycle of operation only where molecular sieve 2 is a molecular sieve on the gas cleaning mode, molecular sieve 4 is molecular sieve on the sieve cooling mode, and molecular sieve 9 is a molecular sieve on a sieve heating mode. As described below, FIG. 3 shows the apparatus for changing the cycle of operation of sieves 2, 4 and 9.

Figure 10:
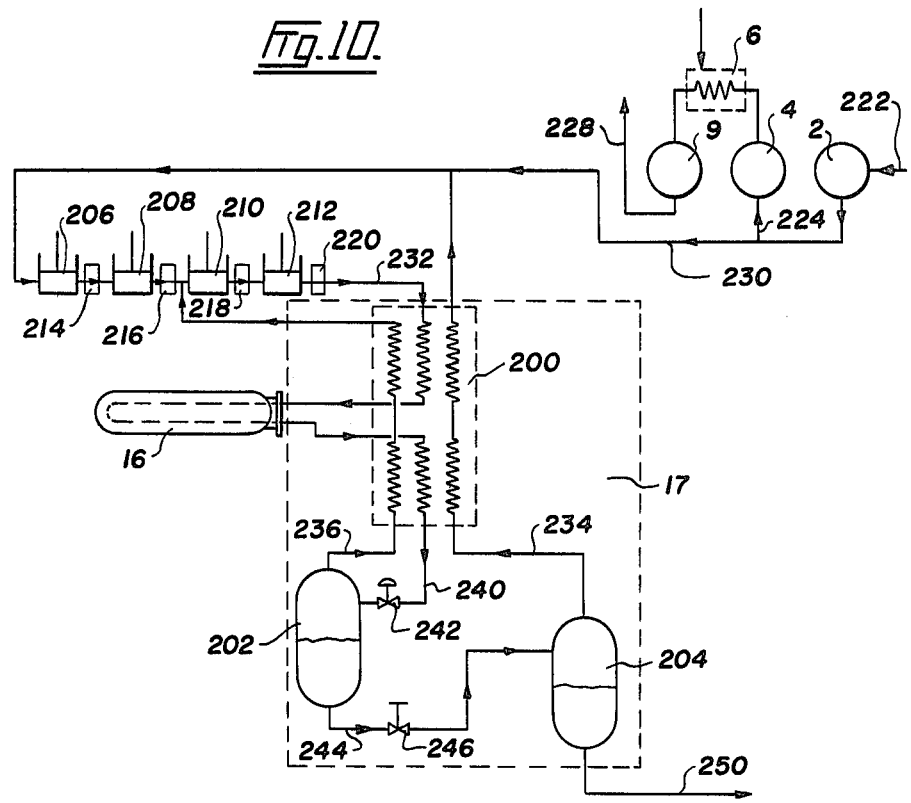
FIG. 10 a schematic diagram further illustrating the process shown in FIG. 1; with the effective piping connections for one cycle of operation.

During the cycle of operation shown in FIG. 1, conduit or manifold 11 connects the bottom of molecular sieve 2 to the top of molecular sieve 4 and to compressor 13. After the input gas is cleaned in molecular sieve 2, a portion of the cleaned gas passes through conduit 11 and molecular sieve 4, cooling the previously heated molecular sieve 4. Conduit or manifold 5 connects the bottom of molecular sieve 4 to heat exchanger 6. After passing through molecular sieve 4, the portion of input gas passes through conduit 5 and heat exchanger 6, whereby the portion is heated by the exhaust gases of internal combustion engine 10. Conduit 7 connects the exhaust manifold of engine 10 to heat exchanger 6. Conduit or manifold 8 connects the heat exchanger 6 to the bottom of molecular sieve 9. The gas heated by heat exchanger 6 enters molecular sieve 9, which has accumulated impurities such as water and carbon dioxide from the input gas or manifold 1 during the last cycle of operation, through conduit 8. Conduit or manifold 12 connects the top of molecular sieve 9 to the intake manifold of engine 10. After heating molecular sieve 9, the dirty gas, containing impurities from molecular sieve 9, passes into engine 10 providing sufficient fuel to operate engine 10. Engine 10 provides power to operate means for liquifying the remaining portion of clean gas passing from molecular sieve 2 through conduit 11. Compressor 13 is a four stage compressor and aftercoolers 14 are connected after each stage. Compressor 13 is connected to cold box 17, containing the low pressure pot 204, medium press pressure pot 202, and heat exchanger 200, as shown in FIG. 10. Also connected between the after coolers 14 and the cold box 17 are the chiller compressor 15 and precooler 16.

As shown in FIG. 1a where the input gas contains up to about 10% air or nitrogen, conduit 11a, shown disconnected in FIG. 1 connects the cold box 17 to the top of molecular sieve 4. Nitrogen-rich flash gas passes from cold box 17 to molecular sieve 4 and comprises the portion of the input gas for regenerating molecular sieves 4 and 9 and for fueling engine 10.

Molecular sieves 2 and 4 are similar to molecular sieve assembly 9 shown in FIG. 2 and described below. The mode of operation of molecular sieves 2,4 and 9 is changed cyclically using the manifolds and three-position valves illustrated in FIG. 3 and described below.

The process involved for liquefying natural gas, using the apparatus illustrated in FIG. 1, is further explained with reference to FIG. 10. Again, the effective piping connections to the molecular sieves for one operational period only are illustrated. The components within cold box 17 are shown within the broken line of FIG. 10. The cold box 17 includes a heat exchanger 200, a medium pressure pot 202, and a low pressure pot 204. The compressor 13 as shown in FIG. 1, comprises a first stage 13a, a second stage 13b, a third stage 13c, and a fourth stage 13d. After coolers 14 are connected after each stage and are shown at 14a, 14b, 14c, and 14d. Input gas manifold 1 enters molecular sieve 2 where it is cleaned. A portion of the input gas from manifold 11 enters and cools molecular sieve 4 and passes through manifold 5 to exhaust gas heat exchanger 6, where it is heated. The hot gas from manifold 8 enters and heats molecular sieve 9. The dirty gas leaving molecular sieve through manifold 12 provides fuel for the engine 10 shown in FIG. 1. The main portion of the cleaned input gas from manifold 11 passes through the stages of compressor 13 and aftercoolers 14 where it is alternately compressed and cooled. The compressed and cooled gas 232 leaving aftercooler 14d is at pressure of approximately 2300 psia and a temperature of approximately 80° F. The gas 232 enters heat exchanger 200 where it cooled by gas 234, passing through heat exchanger 200 from low pressure pot 204, and by gas 236, passing through heat exchanger 200 from medium pressure pot 202. The gas 232 also passes through freon precooler 16 at a temperature of approximately −50° F. The gas 240, having passed through heat exchanger 200 and precooler 16, is at a temperature of approximately −90° F. The gas 240 passes through expansion valve 242 and into medium pressure pot 202. The pressure within medium pressure pot 202 is approximately 300 psia and the temperature is approximately −159° F. The gaseous portion 236 leaving medium pressure pot 202 passes through heat exchanger 200 and enters the third stage 13c of compressor 13. The liquid portion 244 leaves the bottom of medium pressure pot 202, passes through valve 246 and enters low pressure pot 204. The pressure within low pressure pot 204 is approximately 30 psia and the temperature is approximately −242° F. The gaseous portion 234 leaving the top of low pressure pot 204 passes through heat exchanger 200 and is connected to enter the first stage 13a of compressor 13. The liquid portion 250 leaving the bottom of low pressure pot 204 is the liquid natural gas product of the process described.

Figure 7:
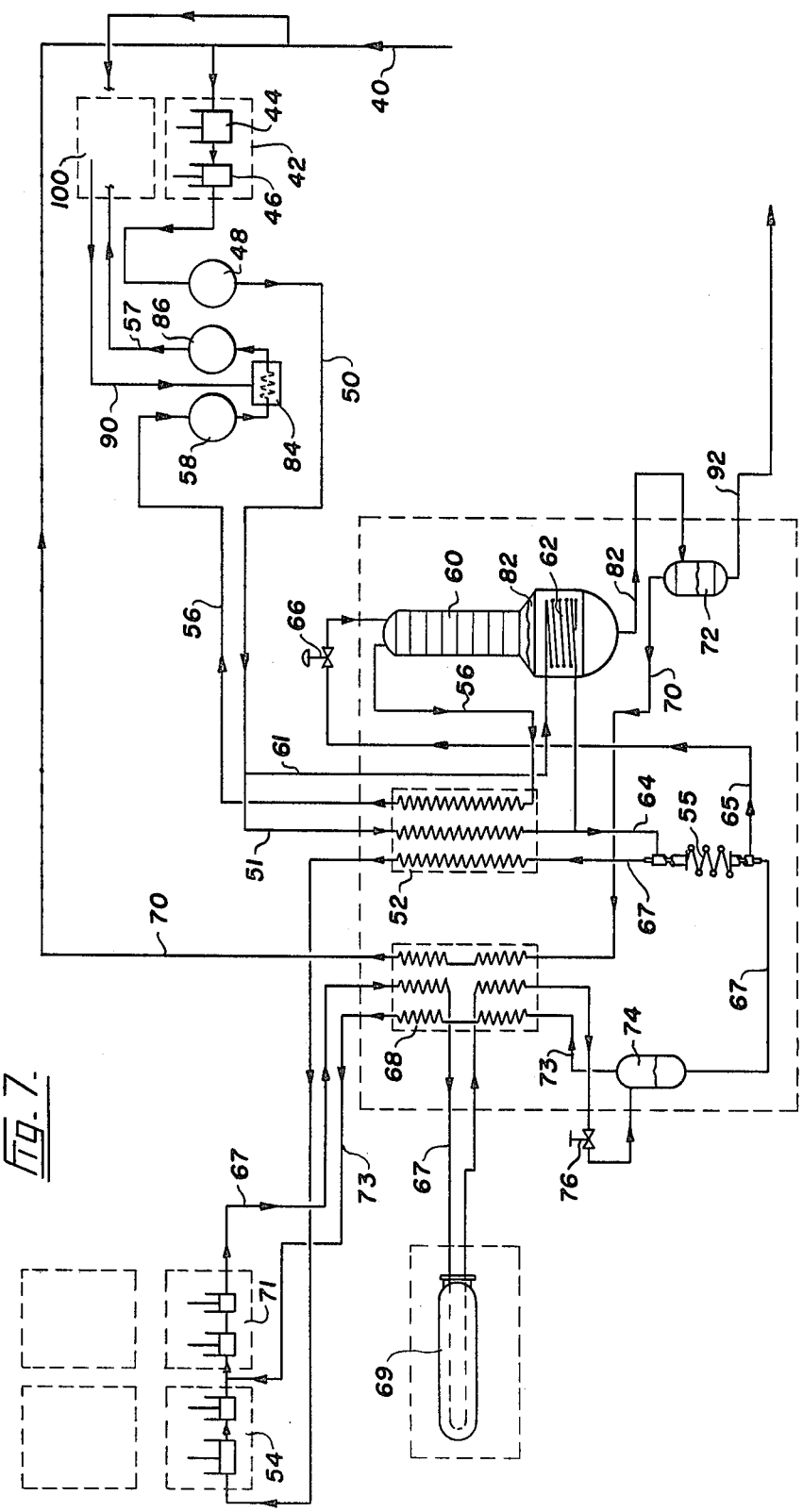
FIG. 7 is a schematic diagram showing a process for liquifying mine gases; with the connections to the molecular sieves for one cycle of operation.
Figure 11:
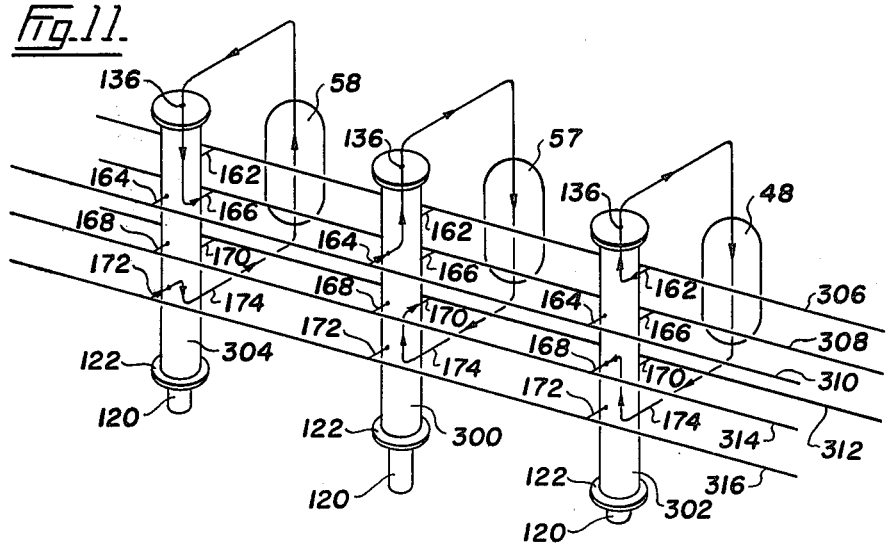
FIG. 11 is a schematic diagram similar to FIG. 3, showing the piping interconnections for the three-position valves as shown in FIG. 8 used to change the cycle of operation of the process illustrated in FIG. 7.

FIG. 7 illustrates schematically a process for liquifying coal mine gases. As for FIG. 1, FIG. 7 shows the effective piping connections to the molecular sieves for one operational period only. The valves and piping used to change the modes of operation of the molecular sieves for different operational periods are shown in FIG. 11 and described below. The temperatures and pressures mentioned below are approximate. The input gas 40 contains air and methane and is taken from drill holes passing from the surface to the working face of a mine. The input gas 40 is compressed by a 2-stage compressor 42 consisting of compressor 44, which compresses the gas to 65 psia, and compressor 46 which compresses the gas to 250 psia. The gas from the compressor passes through manifold 316 to molecular sieve 48 and is cleaned of impurities such as carbon dioxide and water. A portion 51 of the cleaned gas from manifold 308, at a temperature of 80° F., then passes through heat exchanger 52 and it is cooled by the vapor 67 returning to the 2-stage compressor 54 from low pressure cooler 55 and by the waste stream 56 returning to molecular sieve 58 from rectification tower 60. A second portion 61 of the cleaned gas from manifold 308 passes through heat exchanger 62 in the bottom of rectification tower 60, boils off air from the liquified gases 82, and leaves at a pressure of 250 psia and a temperature of 175° F. Gas 64, comprising gas 51 leaving heat exchanger 52 and gas 61 leaving rectification tower 60, passes through low pressure cooler 55 and is cooled by liquid 67 from pressure pot 74. The gas 65 leaves the cooler 55 at −230° F. and 250 psia and then passes through pressure reduction valve 66 to the top of rectification tower 60, where it has pressure of 100 psia and a temperature of −230° F.

Gas 51 is cooled in heat exchanger 52 and low pressure cooler 55 by liquid and vapour 67 which is a portion of the cleaned gas from manifold 308 operating on an essentially closed cycle. Gas 67 passes through two stage compressor 54 and two-stage compressor 71 and leaves at a pressure of 2300 psia and a temperature of 80° F. From compressor 71, gas 67 passes through heat exchanger 68 and freon precooler 69. Gas 67 is cooled in heat exchanger 68 by gas 73, returning to compressor 71 from pressure pot 74, and by gas 70 which returns to compressor 42 from surge pot 72. After being cooled in heat exchanger 68, gas 67 passes through expansion valve 76 into pressure pot 74. The expansion of gas 67 produces a liquid portion which passes through low pressure cooler 55. As mentioned, the gaseous portion 73 returns to to compressor 71. The liquid 67 is heated by gas 64, in low pressure cooler 55, producing gas 67 which passes through heat exchanger 52 and back to compressor 54.

Referring back to rectification tower 60, liquid natural gas 82 collects in the bottom of the tower and the waste stream 56, containing about 80% air and about 20% natural gas, returns to molecular sieve 57 from the top of tower 60 through manifold 310. Because natural gas is permitted in waste stream 56, the size of tower is reduced and design simplified, since a high degree of separation is not necessary. Waste stream 56 cools molecular sieve 57 and passes through manifold 312 to heat exchanger 84 where it is heated by the exhaust 90 of the internal combustion engine 100. The heated gas 48 passes through manifold 306 to molecular sieve 48 and heats molecular sieve 48 to purge it of impurities collected in a previous cycle. From molecular sieve 86, the gas passes through manifold 314 to the internal combustion engine 100 and serves as fuel for the engine. The internal combustion engine 100 provides power for compressors 44, 46, 54, and 71. From the bottom of rectification tower 60, the liquid natural gas 82 passes into surge pot 72. From the surge pot, the gaseous portion 70 returns to provide fuel for the internal combustion engine 100 and the liquid portion 92 is the product liquid natural gas.

Figure 2:
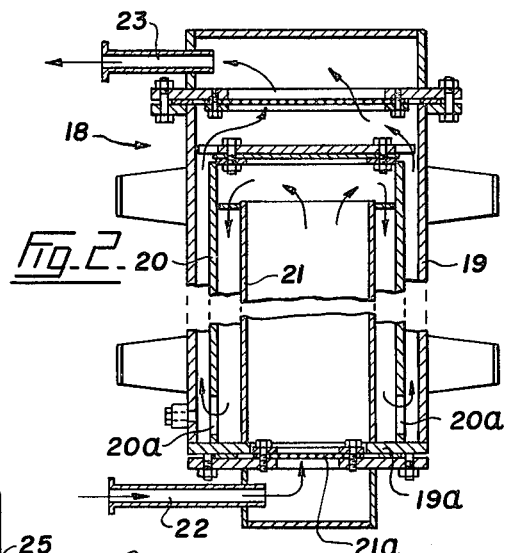
FIG. 2 is one sectional, elevational view of a triple pass molecular sieve assembly.

FIG. 2 illustrates an embodiment of the invention consisting of the triple-pass molecular sieve assembly 9 shown in FIG. 1. Molecular sieves 2 and 4 are identical. Since the volume of gas required as fuel for the engine 10, illustrated in FIG. 1, is less than the normal amount of gas required to regenerate the molecular sieves, molecular sieve 9 provides a means for decreasing the cross-sectional area through which the gas passes and consequently increasing the velocity of the gas, to permit stripping of molecules of impurities from the gas while passing through the molecular sieve. Sieve assembly 9 consists of cylindrical container 19 closed at the top and with a central opening 21a in the bottom 19a. A port 23 is located on the side of container 19 near the top. A second container 20 is concentrically located within the container 19, spaced from the top thereof and sharing the common bottom 19a. A series of ports 20a are located on the cylindrical side of container 20 near the bottom. Container 20 is closed at the top. Container 21 is concentrically located within container 20, shares the common bottom 19a, and has an open top. A port 22 is connected to central opening 21a in bottom 19 of assembly 9. The gas enters the molecular sieve assembly 9 through port 22 and opening 21a and passes upwards through container pipe 21 which is filled with a suitable molecular sieve material. The gas then passes from the open top of container 21 downwards between concentric pipe 21 and concentric pipe 20, the space being filled with a molecular sieve material. The gas passes through ports 20a and vertically upwards between concentric pipe 20 and container 19 again through the molecular sieve material. The cleaned gas exits through port 23. Of course, the reverse flow of gas is possible. Since the walls of concentric pipes 20 and 21 are internal to the molecular sieve assembly 9, heat loss from the passage of hot gas through the molecular sieve during the molecular sieve heating mode is minimized. The limited amount of heat available from the exhaust 7 of engine 10, illustrated in FIG. 1, is thus more adequately conserved.

FIGS. 4, 5, and 6 illustrate 3-position valve 32 as shown in FIG. 3. Valves 33 and 34 are identical. The construction and operation of valve 32 will be described in relation to the apparatus and process for cleaning and liquifying natural gas described above, and illustrated in FIGS. 1 and 10. Other uses for the valve are possible. The valve 32 has a tubular casing 102 of carbon steel pipe. The casing 102 has a plurality of apertures consisting of nozzle 104 for connecting valve 32 to the top of molecular sieve 2, nozzle 106 is for connecting valve 32 to manifold 1 for input gas, nozzle 108 is for connecting 32 to manifold 12 supplying fuel to internal combustion engine 10, nozzle 109 for connecting valve 32 to cleaned gas manifold 11, nozzle 110 for connecting valve 32 to a manifold 8 receiving gas heated by exhaust heat exchanger 6, and nozzle 112 is for connecting valve 32 to a manifold 5 supplying gas to heat exchanger 6. Nozzles 108 and 110 are rotated 90° on the casing 102 from the other nozzles. Casing 102 has a section 114 adjacent nozzle 104 of increased internal diameter.

Slidable within casing 102 is a hollow stem 116 of carbon steel pipe. Rod 120 is threaded into stem 116 at its bottom end. Rod 120 passes through flanges 122 and 124. Flange 122 is welded to casing 102 and flange 124 is bolted to flange 122 (bolts not shown). Rod 120 passes through brass bushing 126 and seals 128 in flange 122. Flange 124 has a silcone O-ring 130 contacting rod 120. Rod 120 is connected to suitable means (not shown), such as hydraulic cylinders, for sliding stem 116 within casing 102.

End 132 of casing 102 is provided with a flange 134 for connecting the open ends 136 of the casing 102 to the bottom of the molecular sieve.

Hollow stem 116 has three sets of apertures 138 140, and 142. Each set of apertures comprises four bores, spaced 90° apart, in the walls of hollow stem 116. Adjacent the sets of apertures 138 and 140, annular chamber 144 and 146 are formed by sections of stem 116 having a decreased diameter. Fixed within hollow stem 116 is bulkhead 148 dividing the hollow stem 116 into section 150 and 152 and preventing the flow of gases through the hollow stem between sections 150 and 152. Fluorocarbon coated seals 153 are located in seal glands 155 in six spaced locations along stem 116 to prevent the leakage of gas between stem 116 and casing 102.

Hollow stem 116 is movable by rod 120 to three positions. The first position is shown in solid lines. As may be seen, because of enlarged section 114 of casing 102, the hollow stem 116 is surrounded by an annular chamber 154 adjacent nozzle 104. Consequently, regardless of which of the three positions the hollow stem is in, gas may pass from nozzle 104 through chamber 154 and the set of apertures 142 into the hollow stem 116. The reverse direction of flow is also possible.

In position 1 the position of valve 32 as shown in FIG. 2, set of apertures 140 is aligned with nozzle 106. Gas from nozzle 106 passes around stem 116 by means of chamber 146, and through all four apertures 140 into the hollow stem 116. Similarly, in the first position, the set of apertures 138 is aligned with nozzle 109. In the first position, inlet gas, for example, uncleaned natural gas, enters the valve 32 through nozzle 106 and enters the hollow stem 116 through the set of apertures 140. The uncleaned gas passes through the hollow stem 116 and out through nozzle 104 to the top of a molecular sieve . The gas, having been cleaned by the molecular sieve, exits through the bottom of the sieve and enters the valve through opening 136. The cleaned gas passed through stem 116 and exits the valve through the set of apertures 38 and nozzle 109 to cleaned gas manifold N.

Postion 2, as indicated by the dotted lines, is the position of valve 34 as shown in FIG. 3. The gas can still enter and leave hollow stem 116 through nozzle 104 as mentioned earlier. However, now set of apertures 140 is aligned with nozzle 108 and set of apertures 138 is aligned with nozzle 110. In position 2, hot gas heated in heat exchanger 6, shown in FIG. 1, by the exhaust of internal combustion engine 10 enters nozzle 110, passes through apertures 138, through hollow stem 116, and exits valve 34 through opening 136. The gas then enters the bottom of a molecular sieve 9 and heats the molecular sieve to clean the sieve of impurities collected in the sieve during a previous cycle when the sieve was cleaning the input gas. The gas leaves the top of the sieve 9 and enters the valve 34 through nozzle 104. The gas then passes through hollow stem 116 and exits valve 34 through nozzle 108 and goes into a manifold 12 for supplying fuel to the internal combustion engine.

Position 3, shown by chain lines, is the position of valve 33 shown in FIG. 3. Apertures 140 are aligned with nozzle 109 and apertures 138 are aligned with nozzle 112. In position 3, cleaned gas enters the valve from manifold 11 through nozzle 109, passes through apertures 140 into hollow stem 116, and leaves the valve through nozzle 104 which is connected to the top of the molecular sieve 4 shown in FIG. 3. The gas cools the molecular sieve, which has been heated during a previous cycle, and leaves the sieve through the bottom. The gas then re-enters the valve through opening 136 at the bottom of the valve and passes through hollow stem 116 exiting through nozzle 112 which is connected to manifold 5 supplying gas to the heat exchanger 6 mentioned earlier.

Referring to FIG. 3, there is illustrated the means for adapting each of three molecular sieves 2, 4 and 9 of FIG. 1 to operate at cyclic intervals in turn, firstly on a gas cleaning mode, secondly on a molecular sieve heating mode, and thirdly on a molecular sieve cooling mode. The molecular sieve assembly consists of molecular sieve 2, molecular sieve 4 and molecular sieve 9. The assembly also includes conduit or manifold 1 for input gas conduit or manifold 12 for regeneration gas to provide fuel for internal combustion engine 10, conduit or manifold 11 for cleaned gas, conduit or manifold 8 for hot regeneration gas, and conduit or manifold 5 for regeneration gas to be sent to heat exchanger 6. The assembly also includes three position valve 32 as shown in FIG. 4, three position valve 33 and three position valve 34. Each three position valve is capable of being positioned in each of three positions 35, 36, and 37 illustrated on three position valves 32, 33 and 34 respectively. With the positions of the three-positioned valves illustrated in FIG. 3 the apparatus operates as shown in FIG. 1 where, molecular sieve 2 operates on the gas cleaning mode, molecular sieve 5 operates on the molecular sieve cooling mode, and molecular sieve 9 operates on the molecular sieve heating mode. The direction of gas flow is illustrated by the arrows on FIG. 3 and, as seen, the input gas in manifold 1 passes through three position valve 32 to the top of molecular sieve 2. The clean gas exiting the bottom of molecular sieve 2 passes through three position valve 32 to the clean gas manifold 11. The clean gas flows through manifold 11 to three-position valve 33 and a portion of the clean gas passes through valve 33 to the top of molecular sieve 4. This portion of the clean gas cools molecular sieve 4 which was heated in the molecular sieve heating mode during the previous cycle of operation. This portion of the cleaned gas exits through the bottom of molecular sieve 4 and enters three position valve 33 where it passes to the heat exchanger 6 through manifold 5. The hot gas from the heat exchanger passes through manifold 8 to three position valve 34 and the to the bottom of molecular sieve 9. The hot gas cleans and regenerates molecular sieve 9 and exits through the top of molecular sieve 9. The dirty gas from sieve 9 passes through three position valve 34 to manifold 12 which supplies the dirty gas to an internal combustion engine 10 for fuel.

It may easily be seen that by varying the positions of three position valves 32, 33 and 34 shown in FIG. 3, the mode of operation of each of the three molecular sieves may be cyclically rotated.

FIGS. 8 and 9 illustrate a second three-position valve 304 for gases which is identical with valves 300 and 302 shown in FIG. 11. This embodiment is similar to that illustrated in FIG. 4, and the same numbers are used to identify similar parts, but is adapted for the process illustrated in FIG. 7. Valve 304, shown in FIG. 8, is connectable to six manifolds as shown in FIG. 11. The valve 304 has a casing 102 and a hollow stem 116 slidable within. A rod 120 is connected to one end of hollow stem 116 by pin 180. The casing 102 is closed at the same end by flange 122 which is welded to the casing 102 and by seals 128 around rod 120. Similar to the valve 32 illustrated in FIG. 4, valve 304 has an open end 136 for connecting to one end of a molecular sieve and three sets of apertures 138, 140, and 142. In this embodiment, however, the sets of apertures each comprise eight elongate apertures 176 spaced around hollow stem 116. Additionally, in this embodiment, stem 116 is spaced from the inside of casing 102 by annular seals 182 which are attached to hollow stem 116 by set screws 184. It is to be understood that similar modifications could be made to the embodiment shown in FIG. 4.

Valve 304 has seven nozzles, nozzles 164, 168, and 172 being spaced 180° around casing 102 from nozzles 162, 166, 170 and 174. With reference to FIG. 11, nozzle 162 is connectable manifold 306 for heated gas 57 from the heat exchanger 84 shown in FIG. 7. Nozzle 164 is connectable to manifold 310 for waste stream 56 coming from separation tower 60 shown in FIG. 7. Nozzle 166 is connectable to manifold 308 for cleaned gas, as shown in FIG. 7 coming from molecular sieve 58. Nozzle 168 is connectable to manifold 314 for supplying dirty gas as shown in FIG. 7 passing to engine 100. Nozzle 170 is connected to manifold 312 for supplying gas to heat exchanger 84 as shown in FIG. 7. Nozzle 172 is connectable to manifold 316 for input gas. Nozzle 174 is attachable to the bottom of molecular sieves 48, 57, and 58 as shown in FIG. 11.

Similar to valve 32 shown in FIG. 4, valve 304 has three positions indicated by the bottom end of hollow stem 116 at first position 190, second position 192 and third position 194. In FIG. 11, where the valves are inverted from the position shown in FIG. 8, valve 304 is in first position 190, valve 300 is in second position 192, and valve 302 is in third position 194. Similar to valve 32 shown in FIG. 4, because of annular chamber 154, nozzle 174 communicates with the center of hollow stem 116 through set of apertures 142 regardless of the position of valve 160. Additionally, also similar to valve 32, valve 304 is divided into two portions by bulkhead 148 which provides for two separate flows of gases through the valve.

In first position 190, set of apertures 140 is aligned with nozzle 172 allowing for the passage of gas between nozzle 172 and nozzle 174. With reference to FIG. 11, this allows for the passage of gas through from input gas manifold 316 to the bottom of molecular sieve 58 through valve 304. Also in position 190, set of apertures 138 is aligned with nozzle 166 allowing for the passage of gas between nozzle 166 and open end 136. In valve 304 of FIG. 11, this permits the clean gas from the top of molecular sieve 58 to pass through valve 304 to clean gas manifold 308.

In position 192, as seen in valve 300 of FIG. 11, set of apertures 138 is aligned with nozzle 164, thus allowing for gas to pass between nozzle 164 and open end 136. In FIG. 11, this permits cleaned gas from manifold 310 carrying gas from separation tower 60, as seen in FIG. 7, to pass through valve 300 to the top of molecular sieve 57. Also in position 192, set of apertures 140 is aligned with nozzle 170 permitting gas to pass between nozzle 170 and nozzle 174. In valve 300 of FIG. 11, this permits the gas from the bottom of molecular sieve 57 having cooled molecular sieve 57, to pass through valve 300 to manifold 312 carrying gas to heat exchanger 84 as seen in FIG. 7.

In position 194, as seen with reference to valve 302 of FIG. 11, set of apertures 138 is aligned with nozzle 162 permitting gas to pass between nozzle 162 and open end 136. As seen in FIG. 11, this permits gas from manifold 306, carrying gas from heat exchanger 84 in FIG. 7, to pass through valve 302 to the top of molecular sieve 48. Also in position 194, set of apertures 140 is aligned with nozzle 168, permitting gas to pass between nozzle 174 and nozzle 168. In FIG. 11, this permits the gas from the bottom of molecular sieve 48, having heated molecular sieve 48, to pass through valve 302 to manifold 314 carrying gas to engine 100, as seen in FIG. 7.

As may readily be seen, hydraulic or other means could be employed to change the position of rod 120 so valves 300, 302, and 304, as seen in FIG. 11, cyclically change their position so that molecular sieves 48, 57 and 58 alternately clean the input gas, are heated, and then cooled.

What I claim is:

1. An apparatus for purifying and liquifying natural gas comprising:

a plurality of molecular sieve assemblies for purifying the gas;

means for liquifying the gas comprising a compressor powered by a motor fueled by a portion of the natural gas;

a heat exchanger for heating the portion of the natural gas with exhaust gases from the motor; and means for periodically changing modes of operation of the sieve assemblies so a first sieve assembly operates on a gas cleaning mode, wherein the natural gas passes through the first sieve assembly to the means for liquifying, and a second sieve assembly is regenerated during a heating mode, wherein the portion of the gas from the heat exchanger passes through the second sieve assembly to heat the second sieve assembly and purge accumulated impurities, and a cooling mode, wherein the portion of gas flowing to the heat exchanger passes through the second sieve assembly to cool the second sieve assembly;

each sieve assembly comprising a plurality of passes each of which has a cross-sectional area which is less than that of the entire sieve assembly to increase the velocity of the portion of gas passing through the sieve assembly so that the portion of gas for fueling the motor is sufficient to regenerate the sieve assemblies.

2. An apparatus as claimed in claim 1, each sieve assembly comprising a multiple pass molecular sieve for cleaning gases of impurities such as carbon dioxide and water with at least two concentric containers to reduce loss of heat, each sieve having a first pass for the gas through an inside container and a second pass for the gas between the inside container and an outside container, the cross-sectional area of the containers being such that a given volume flow of the gas has a velocity through the sieve sufficient to clean the gas.

3. An apparatus as claimed in claim 1, each sieve assembly comprising a molecular sieve for cleaning a gas of impurities such as carbon dioxide and water having three passes for the gas and comprising three concentric containers filled with a suitable molecular sieve medium, the molecular sieve having a first pass in a first direction through an inner container, a second pass in a second direction between the inner container and a second container enclosing the inner container, and a third pass in the first direction between the second container and an outside container enclosing the second container.

4. An apparatus as claimed in claim 1, comprising three molecular sieve assemblies, during each period of operation one molecular sieve assembly operating on the gas cleaning mode, another sieve assembly operating on the cooling mode and a further sieve assembly operating on the heating mode.

5. An apparatus for purifying and liquifying a natural gas comprising:
a plurality of molecular sieve assemblies for purifying the gas;
means for liquifying the gas comprising a compressor powered by a motor fueled by a portion of the natural gas;
a heat exchanger for heating the portion of the natural gas with exhaust gases from the motor; and
means for periodically changing modes of operation of the sieve assemblies so a first sieve assembly operates on a gas cleaning mode, where the natural gas passes through the first sieve assembly to the means for liquifying, and a second sieve assembly is regenerated during a heating mode, where the portion of the gas from the heat exchanger passes through the second sieve assembly to heat the second sieve assembly and purge accumulated impurities, and a cooling mode, where the portion of gas flowing to the heat exchanger passes through the second sieve assembly to cool the second sieve assembly, the means for periodically changing the modes of operation comprising a three position valve connected to each molecular sieve assembly with one position for each mode of the sieve assemblies, each valve being connected to a first conduit for the input gas, a second conduit for the cleaned gas, a third conduit for supplying gas to the heat exchanger, a fourth conduit for gas heated by the heat exchanger and a fifth conduit for supplying gas to the motor as fuel.

6. An apparatus as claimed in claim 5, each valve comprising:
a tubular casing with casing apertures spaced along the casing for the passage of gas;
a tubular stem slidable within the casing and having stem apertures spaced along the stem, each stem aperture permitting gas to pass from a casing aperture into the stem, the stem being slidable to at least two positions wherein at least one stem aperture is aligned with a casing aperture; and
sealing means between the stem and the casing for preventing the leakage of gas.

7. An apparatus as claimed in claim 6, wherein the stem and casing have an open end for the passage of gas.

8. An apparatus as claimed in claim 7, wherein the stem has a bulkhead for preventing the passage of gas between a first section of the stem and a second section of the stem, providing two separate passageways for gas through the stem.

9. An apparatus as claimed in claim 8 wherein:
a first passageway comprises a first set of stem apertures which communicate with a first set of casing apertures at each position of the stem, a second set of stem apertures which communicate with different sets of casing apertures at each stem position and a portion of the stem to one side of the bulkhead; and
a second passageway comprises the open end of the stem and the casing, a third set of stem apertures which communicate with different sets of casing apertures at each stem position, and a portion of the stem to a side of the bulkhead opposite the one side.

10. An apparatus as claimed in claim 5 comprising three molecular sieve assemblies, during each operational period one molecular sieve assembly operating on the gas cleaning mode, another molecular sieve assembly operating on the cooling mode and a further molecular sieve assembly operating on the heating mode.

11. An apparatus as claimed in claim 5 wherein the conduits are manifolds.

12. The apparatus of claim 5 further comprising conduit means for directing all of the portion of gas which passes through the second sieve assembly during its cooling mode to the heat exchanger.

13. The apparatus of claim 5 further comprising conduit means for directing the portion of gas from the second sieve assembly in its cooling mode directly to the heat exchanger.

14. The apparatus of claim 5 further comprising conduit means for directing the portion of gas from the second sieve assembly in its heating mode directly to the motor, thereby fueling the motor and powering the compressor.

15. An apparatus for purifying and liquifying a stream of impure natural gas comprising:
three regenerable adsorption assemblies for purifying the gas, a first of said adsorption assemblies being in a purifying mode, a second of said adsorption assemblies being in a cooling mode having previously been regenerated, and a third of said adsorption assemblies being in a regenerating mode;
means for liquifying the gas, including a compressor;
an engine for driving said compressor and for providing engine exhaust heat;
a heat exchanger;
means for conveying the exhaust of said engine to one side of said heat exchanger;
a first conduit means for conveying the stream of impure natural gas to said first adsorption assembly to purify the gas;
a second conduit means for conveying a portion of the now-purified gas from said first adsorption assembly to said second adsorption assembly, thereby cooling said second adsorption assembly which has previously been regenerated;
a third conduit means for conveying the portion of the gas from said second adsorption assembly directly to said heat exchanger wherein the gas is heated by the engine exhaust;
a fourth conduit means for conveying the portion of the now-heated gas from said heat exchanger and to said third adsorption assembly, thereby regenerating said third adsorption assembly;

a fifth conduit means for conveying the portion of the gas from said third adsorption assembly directly to said engine where the gas is burned as fuel, thereby providing power to said compressor; and valve means in said conduit means for periodically shifting the flow of gas through said first, second and third adsorption assemblies to change the mode thereof as needed to purify the gas.

16. The apparatus of claim 15 wherein said valve means comprise at least three separate three-position valves, one of which is connected to each adsorption assembly with one position for each mode of operation.

17. The apparatus of claim 16 wherein each valve comprises:

a tubular casing with casing apertures spaced along said casing for the passage of gas;

a tubular stem slidable within said casing and having stem apertures spaced along said stem, each stem aperture permitting gas to pass from one of said casing apertures into said stem, said stem being slidable to at least two positions wherein at least one stem aperture is aligned with one of said casing apertures; and sealing means between said stem and casing for preventing the leakage of gas.

18. The apparatus of claim 15 wherein each adsorption assembly comprises a molecular sieve which includes a plurality of passes, each of which has a cross-sectional area which is less than that of the entire sieve assembly.

19. The apparatus of claim 18 wherein said plurality of passes are concentric with one another.

* * * * *